Jan. 11, 1949.　　　F. D. MAHONEY　　　2,458,714
COUPLING
Filed March 5, 1946

INVENTOR.
FRANK D. MAHONEY
BY J. E. Trabucco
ATTORNEY.

Patented Jan. 11, 1949

2,458,714

UNITED STATES PATENT OFFICE 2,458,714

COUPLING

Frank D. Mahoney, San Francisco, Calif.

Application March 5, 1946, Serial No. 652,009

1 Claim. (Cl. 285—97.3)

This invention relates to improvements in coupling means for tubular conduits.

An object of my invention is to provide an improved coupling for securely holding two tubular conduits in connected rotatable relationship.

Another object of my invention is to provide improved coupling means of the kind characterized, embodying a flexible locking member capable of being readily applied in an engaging position with respect to two joined conduits, and which when so applied allows the pivotal movement of either tubular member.

A further object of my invention is to provide an improved coupling means of the kind characterized, embodying a ring shaped sealing member arranged to prevent the escape of fluid passing through the coupling.

Other and further objects of my invention will be pointed out hereinafter, or will be indicated in the appended claim, or will be obvious to one skilled in the art upon an understanding of the present disclosure. For the purpose of this application, I have elected to show herein certain forms and details of coupling means for tubular conduits representative of my invention; it is to be understood, however, that the embodiment of my invention herein shown and described is for the purpose of illustration only, and that therefore it is not to be regarded as exhaustive of the variations of the invention.

Figure 1:
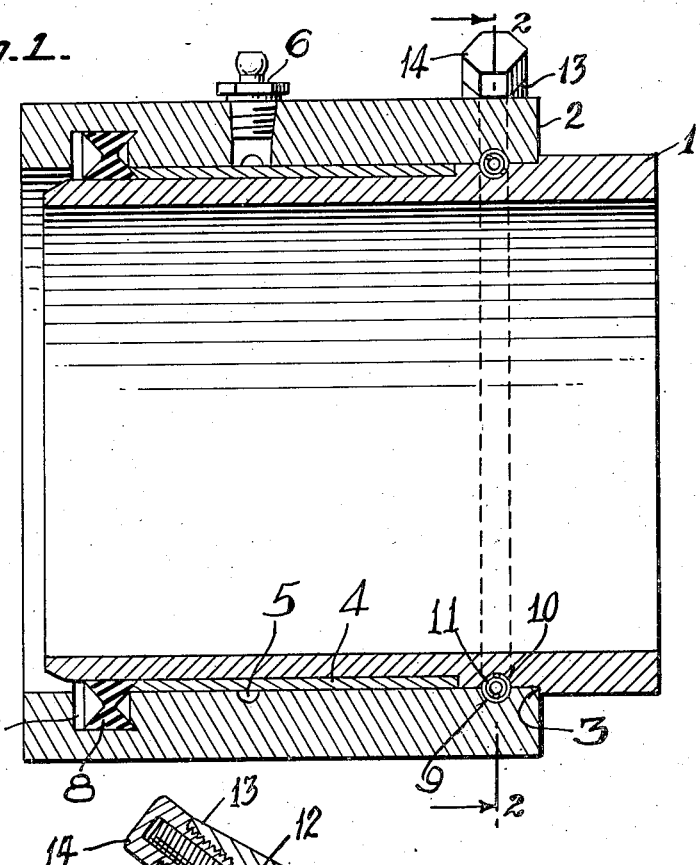
Figure 2:
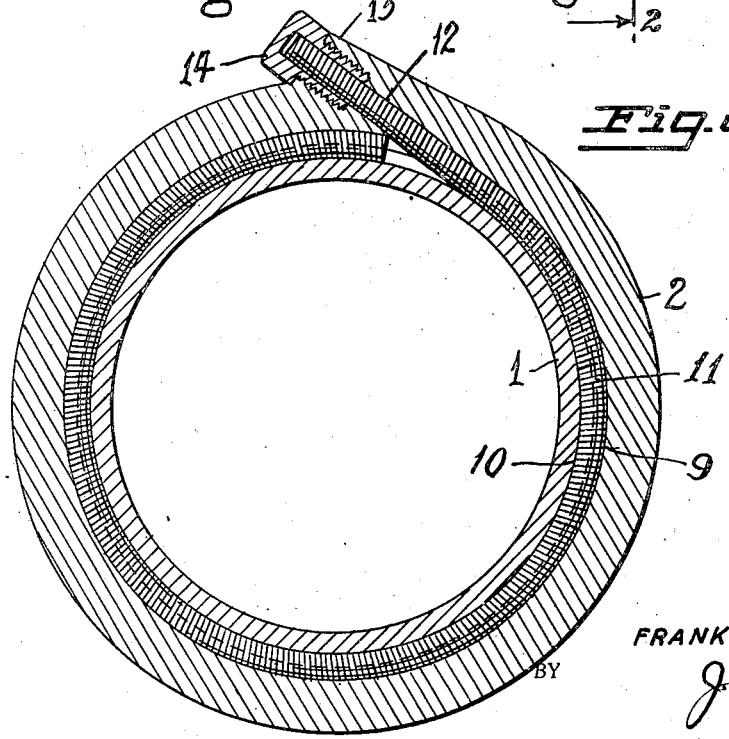

In the accompanying drawings:

Fig. 1 is a longitudinal vertical sectional view taken through a coupling embodying the principles of my invention; and Fig. 2 is a sectional view taken on the line 2—2 of Fig. 1.

In the illustration appearing on the drawings I have shown two telescopically arranged conduits 1 and 2 which in ordinary practise are welded or otherwise suitably secured to lengths of pipe, fittings or the like.

The inner conduit 1 is formed with an annular shoulder 3 against which the inner end of the conduit 2 abuts. Encircling the conduit 1 is a sleeve-type bushing 4 which provides a bearing surface for the conduit 2. A circular or spiral groove 5 formed on the inner surface of the conduit 1 is supplied with a lubricant by means of a pressure type fitting 6.

The outer conduit 2 adjacent the inner beveled end of the inner conduit 1 is formed with an annular groove 7 within which is positioned a flexible sealing ring 8 made preferably from rubber or other resilient material. The sealing ring is formed at its opposite sides with substantially V-shaped grooves, the outer one of which is exposed to the fluid passing through the coupling. The outer and inner annular sides or surfaces of the flexible sealing ring are in engagement, respectively, with the outer wall of the groove 7 and with the outer surface of the conduit 1. The sealing ring at its inner edge underrides and engages with the beveled end of the bushing 4. When fluid entering the groove 7 from the interior of the coupling exerts a pressure against the V-shaped exposed side of the sealing ring 8, the latter is forced into firm engagement with the inner conduit 1, the outer conduit 2 and the bushing 4, thereby providing an effective seal which prevents the escape of any fluid through the joint.

To provide positive means for preventing the disconnection of the conduits during the normal use of the coupling, opposed annular semi-circular grooves 9 and 10 are provided in the inner surface of the outer conduit 2 and the outer surface of the inner conduit 1, respectively, the said grooves forming a circular opening of sufficient uniform size for receiving a flexible shaft or cable 11. The wall of the outer conduit 2 is formed with a circular opening 12 of substantially the same diameter as the combined grooves 9 and 10, the said opening 12 being inclined and extending somewhat tangentially from a point at the outer surface of the conduit 2 to a point where it meets the groove 9. The wall of the conduit 2 at a point where the outer end of the opening 12 is located is formed with a boss 13, and a threaded opening therein which is a continuation of the opening 12 is adapted to receive an axially recessed cap screw 14. The length of the flexible cable 11 is such that it extends entirely around the inner conduit 1, through the opening 12 and well into the axial recess in the cap screw 14.

The annular semi-circular grooves 9 and 10 in the outer and inner conduits are so positioned that they are exactly opposite one another when the outer conduit is in abutting relationship with the shoulder 3 of the inner conduit. When the conduits are thus connected the flexible cable 11 is inserted into the opening 12 and fed inwardly until its inner end has moved through a complete circle and engages with a side thereof at the inner end of the said opening 12. When so positioned the outer end of the cable is inserted into the axial recess of the cap screw 14 and the latter is then screwed into the threaded outer end of the opening 12. With the cap screw 14 firmly engaging with the outer end of the cable 11, there is no possibility of the latter becoming detached with respect to the two conduits. Since the cable is incapable of being compressed in the event a strong pull is exerted upon either or both of the conduits in opposite directions, there is no possibility of the coupling becoming disconnected when in normal use. The cable being in sliding engagement with the semi-circular walls of the annular grooves 9 and 10, either of the conduits is free to turn should a relative adjustment of the latter be desired.

The sealing ring 8 having V-shaped grooves at opposite sides thereof is capable of providing an effective seal which prevents fluid from proceeding into the interior of the coupling from without when external pressures are greater than those from within.

What I claim is:

In a coupling, two tubular conduits having adjacent ends positioned one inside the other and arranged for pivotal adjustment, the inner conduit having an annular shoulder for engagement by the end of the outer conduit, an annular bushing interposed between the joined ends of the conduits, the said bushing having an end abutting an annular shoulder on the inner conduit and its opposite end formed with an annular beveled edge, an annular seat formed at the inner surface of the outer conduit and positioned adjacent the beveled end of the bushing, a resilient sealing ring positioned inside the annular seat and arranged with one side thereof exposed to the fluid passing through the coupling and its opposite side extending between the beveled end of the bushing and the outer surface of the inner conduit, whereby the pressure of the fluid passing through the coupling will urge the sealing ring into sealing relationship with the inner conduit, the sealing ring and the outer conduit.

FRANK D. MAHONEY.

REFERENCES CITED

The following references are of record in the file of this patent:

UNITED STATES PATENTS

| Number | Name | Date |
| --- | --- | --- |
| 1,514,276 | Whalen | Nov. 4, 1924 |
| 1,938,829 | Hamer | Dec. 12, 1933 |
| 2,221,064 | Tobler | Nov. 12, 1940 |
| 2,310,490 | Melson | Feb. 9, 1943 |